United States Patent [19]

Young et al.

[11] 4,412,650
[45] Nov. 1, 1983

[54] SNAP ACTING HEAT MOTOR OPERATED GAS VALVE

[75] Inventors: Kevin L. Young, Garrett; Jesse H. Turner, Auburn, both of Ind.

[73] Assignee: Essex Group, Inc., Fort Wayne, Ind.

[21] Appl. No.: 361,949

[22] Filed: Mar. 25, 1982

[51] Int. Cl.³ .......................................... G05D 23/10
[52] U.S. Cl. ............................. 236/48 A; 236/68 B; 236/101 E; 251/11
[58] Field of Search .............. 236/48 A, 68 B, 101 B, 236/101 E; 251/11; 337/377, 378; 335/192, 194

[56] References Cited
U.S. PATENT DOCUMENTS

| 1,885,053 | 10/1932 | Slough | 236/68 B |
| 2,628,296 | 2/1953 | Dillman | 335/194 X |
| 2,685,412 | 8/1954 | Schell | 236/68 B |
| 3,227,370 | 1/1966 | Houser | 236/48 |
| 3,229,956 | 1/1966 | White | 251/11 |
| 3,366,140 | 1/1968 | Dunn | 251/11 X |
| 3,442,483 | 5/1969 | Schwartz | 251/11 |
| 3,591,138 | 7/1971 | Wolfe | 251/11 X |
| 3,876,137 | 4/1975 | Kelly et al. | 236/48 |
| 3,896,857 | 7/1975 | Turner et al. | 251/11 X |
| 4,053,136 | 10/1977 | Perl | 251/11 |
| 4,067,539 | 1/1978 | Perl | 251/11 |
| 4,102,496 | 7/1978 | Perl | 238/48 |

Primary Examiner—William E. Tapolcai
Attorney, Agent, or Firm—Robert D. Sommer

[57] ABSTRACT

A snap acting heat motor operated gas valve having a valve member carried by a spring blade that is secured to one end of an electrically heated control bimetal strip. Magnetic means associated with the spring blade normally bias the valve member to a closed position to permit opening of the valve member upon a predetermined heating of the control bimetal member and to effect a snap action opening and closing of the valve member. An ambient temperature compensating bimetal member has a cantilever portion in spaced relation to the control bimetal strip and acting on the spring blade to offset the effects of ambient temperature changes upon the control bimetal member.

5 Claims, 2 Drawing Figures

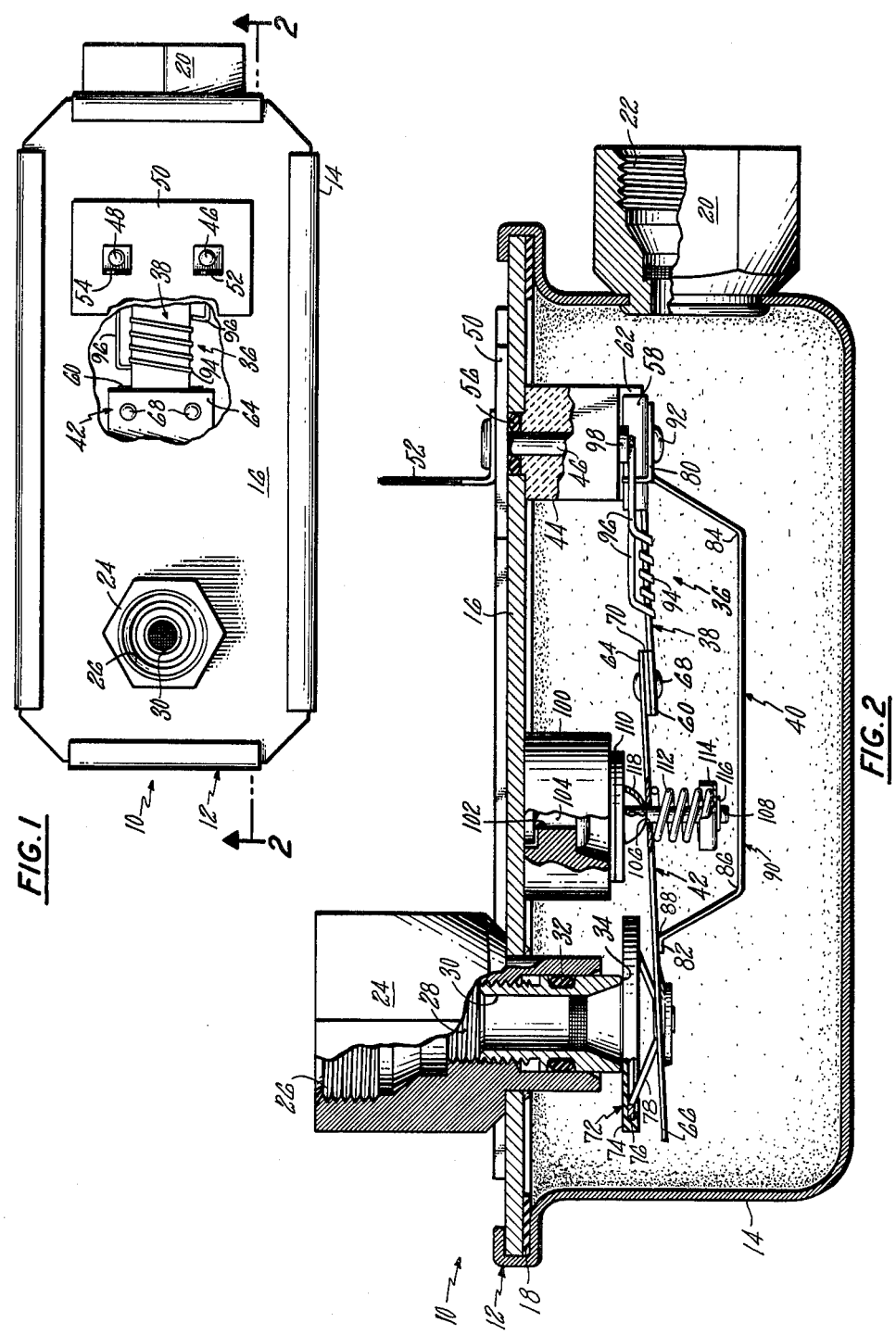

SNAP ACTING HEAT MOTOR OPERATED GAS VALVE

BACKGROUND OF THE INVENTION

This invention relates to snap acting heat motor operated gas valves, and particularly to an improved heat motor operator of the bimetal type for gas valves.

The gas valve of this invention is particularly useful in conjunction with an electric resistance igniter of the hot surface type in a gas burner system. In such systems, the electric heater of a heat motor operated gas valve is operated directly in series with an igniter such as a silicon carbide igniter which has a negative temperature coefficient of resistance. When electric power is applied to such a system, the resistance value of the igniter decreases as the igniter becomes heated and results in an increasing current flow through the series connected valve. Accordingly, the gas valve must be designed to open only when the current level reaches or exceeds a predetermined value at which the igniter is sufficiently heated to ignite the gas that is supplied upon opening of the valve. It is also essential that the gas valve open and close rapidly without any tendency to modulate open and closed even though the ambient temperature in which the valve operates may vary from normal room temperatures to temperatures as high as 300° F. Because of variations in current characteristics and resistance values of igniters, it has been considered necessary to carefully adjust each heat motor operated gas valve to match the particular type of igniter with which it is used.

One type of heat motor operated gas valve used in gas burner systems is disclosed in the White U.S. Pat. No. 3,229,956 granted Jan. 18, 1966. The gas valves shown in this patent each utilizes a control bimetal actuator which is heated by an electric heater to move a valve member attached to a leaf spring carried by the bimetal actuator. The latter also carries an ambient temperature compensating bimetal which acts on the leaf spring to offset the effects of ambient temperature changes upon the control bimetal actuator. The valve member includes a flexible diaphragm element employed to promote a snap action motion of the valve member relative to its valve seat. The valves disclosed in this White patent do not have the critical current opening characteristics required for use in conjunction with a series connected silicon carbide igniter in a gas burner system. It will be apparent that the current value required to open such a normally closed valve will be affected by the pressure of the gas supplied to the valve. Although, such a valve has a snap action opening motion when energized at suitable current levels, it has a tendency to modulate open and closed when energized at lower current levels.

It is known, of course, that snap action operation of a gas valve may be obtained by employing a magnet arrangement. The Houser U.S. Pat. No. 3,227,370 granted Jan. 4, 1966 and the Kelly et al. U.S. Pat. No. 3,876,137 granted Apr. 8, 1975, for example, each disclose a gas valve of this type. However, a magnet arrangement cannot be satisfactorily employed with the gas valves disclosed in the aforesaid White patent. In these valves, the plane of the valve member support departs substantially from the plane of the valve seat with increasing ambient temperatures and thus would act to separate the magnet and armature of a magnet arrangement at higher ambient temperatures.

Another type of heat motor operated gas valve used in gas burner systems is disclosed in the Perl U.S. Pat. No. 4,102,496 granted July 25, 1978. The gas valves shown in that patent each utilizes a control bimetal actuator which is heated by an electric heater to operate an over-center spring mechanism for effecting snap opening and closing of a valve member. The use of a spring in valves of this type is disadvantageous since it may become fatigued after some use and cause the operating characteristics of the valve to vary. Furthermore, such gas valves are relatively expensive to manufacture and their costs are prohibitive for use of the valves in many gas burner systems.

SUMMARY OF THE INVENTION

The present invention provides a snap acting heat motor operated gas valve which is operable to an open condition only when supplied with electric power exceeding a selected value that is not substantially affected by changes in inlet gas pressure or ambient temperature, yet is compact in size, reliable in operation and of low manufacturing cost.

The present invention is generally characterized by an improved heat motor operator for a gas valve having a housing provided with a valve seat extending into the housing from a gas outlet, and further having a valve member cooperating with the valve seat. The heat motor operator includes a spring blade carrying the valve member at one end and having its other end secured to a control bimetal strip that carries an electric heater. Magnetic means associated with the spring blade includes an armature member and a permanent magnet member which when attracted to each other urge the spring blade to a normal position biasing the valve member to a closed position seated on the valve seat. The control bimetal member is operable upon a predetermined heating thereof by the heater to apply an operating force to the spring blade sufficient to overcome the magnetic attractive force between the armature and magnet members and to thereby remove the valve member from the valve seat with a snap action. After sufficient cooling of the control bimetal strip following deenergization of the heater and the resulting return movement of the spring blade, the armature and magnet members cooperate to effect a snap action closing of the valve member on the valve seat. To offset the effects of ambient temperature changes upon the control bimetal member, an ambient temperature compensating bimetal member is mounted in the housing with a cantilever portion thereof in spaced relation to the control bimetal strip and acting on the spring blade.

In accordance with a preferred embodiment of the invention, the armature member is carried by the spring blade and is biasingly mounted thereon to permit a limited movement of the spring blade relative to the armature away from the magnet member. The ambient temperature compensating bimetal member preferably has a substantially greater length and a correspondingly substantially lower deflection constant than the control bimetal strip. In addition, the valve seat may be adjustably mounted in the gas outlet for adjusting the normal closure force of the valve member against the valve seat.

For a better understanding of the invention, reference may be had to the following detailed description taken in connection with the accompanying drawing, in which:

BRIEF DESCRIPTION OF THE DRAWINGS

FIG. 1 is a top view, partly broken away, of a heat motor operated gas valve according to the present invention; and FIG. 2 is a sectional view, partly broken away, taken generally along line 2—2 of FIG. 1 and showing the gas valve in its normally closed state.

DESCRIPTION OF THE PREFERRED EMBODIMENT

Referring now to the drawing, a heat motor operated gas valve 10 in accordance with the present invention includes a housing 12 which has a body 14 and a cover plate or wall 16. A gasket 18 is disposed between the body 14 and the wall 16 and the edges of the body 14 are crimped over the wall 16 to seal the housing 12. An inlet fitting 20 is fixed and sealed to the body 14 at any suitable location and is internally threaded at 22 to receive an external conduit for supply of gas to the housing 12. An outlet fitting 24 is fixed and sealed to the wall 16 and is internally threaded at 26 for connection to an external conduit. The outlet fitting 24 also is internally threaded at 28 to receive an adjustable hollow screw 30 which may be sealed to the fitting 24 by an O-ring 32. The screw 30 has an inner end extending into the housing 12 and forming an annular valve seat 34. Adjustment of the position of the valve seat 34 relative to the wall 16 may be accomplished by rotation of the screw 30.

Within the housing 12 is a heat motor operator 36 which includes a control bimetal strip 38, an ambient temperature compensating bimetal member 40 and a spring blade 42. To support these elements of the heat motor operator 36, a ceramic mounting block 44 is secured to the wall 16 by two rivets 46 and 48 passing therethrough and through an outer insulator plate 50 and having their respective outer ends staked against terminals 52 and 54. The openings in the wall 16 through which the rivets 46 and 48 pass are sealed by O-rings 56.

The control bimetal strip 38 has first and second end portions 58 and 60, respectively, with the first end portion 58 received by a depending portion 62 of the mounting block 44. The spring blade 42, which may be formed from stainless steel, has first and second ends 64 and 66, respectively, with one end 64 attached to the end portion 60 of the control bimetal strip 38 by rivets 68 but thermally insulated therefrom by an insulator 70. At its second end 66, the spring blade 42 carries a poppet valve member 72 which comprises a resilient disc 74 secured to a back-up plate 76 with outwardly extending arms 78 fixed to the end 66 of the spring blade 42.

The ambient temperature compensating bimetal member 40 has first and second ends 80 and 82, respectively, and is bent at 84, 86 and 88 to provide an outer cantilever portion 90 offset from the end 80 and spaced from the bimetal strip 38 and the spring blade 42. The end 80 of the bimetal member 40 overlies the end portion 58 of the bimetal strip 38 and together with the end portion 58 is fixedly secured to the mounting block 44 by a rivet 92. The free end 82 of the bimetal member 40 abuts the spring blade 42 adjacent its second end 66. The effective length of the bimetal member 40 is about twice the effective length of the control bimetal strip 38. For offsetting the effect of ambient temperature changes upon the control bimetal strip 38, the bimetal member 40 is constructed of a bimetal material having a correspondingly substantially lower deflection constant than that of the bimetal strip 38.

An electrical resistance heater 94 is wrapped about a substantial length of the control bimetal strip 38. The electrical leads 96 of the heater 94 are welded to the respective heads 98 of the rivets 46 and 48 which are electrically connected, respectively, to the terminals 52 and 54.

A generally cylindrical permanent magnet 100 is disposed adjacent the valve seat 34 and is provided with an axial bore 102 therethrough to receive a mounting stud 104. One end of the stud 104 is welded to the wall 16 and its other end is swaged to fix the magnet 100 to the wall 16. Adjacent the magnet 100, the spring blade 42 has an aperture 106 through which is mounted a stem 108 which carries a disc-like armature 110 in opposed relation to the magnet 100. The armature is resiliently biased against the spring blade 42 by a coil spring 112 encircling the stem 108 and confined between the spring blade 42 and a washer 114 which may be held in place by a snap ring 116. A dish-shaped or domed spacer washer 118 located on the stem 108 between the spring blade 42 and the armature 110 permits pivotal movement of the latter relative to the spring blade 42. It will be apparent that, if desired, the permanent magnet 100 could be carried by the spring blade 42 and the armature 110 could be mounted on the wall 16.

The gas valve 10 is of the normally closed type with the valve disc 74 normally biased to a closed position seated on the valve seat 34 by the magnetic attraction of the armature 110 to the magnet 100 and the normal resiliency of the spring blade 42 and the unheated bimetal strip 38. Although the gas pressure inside the housing 12 acts on the inlet side of the valve disc 74, the force developed by this internal pressure throughout the usual operating pressure range of the gas valve 10 is neglible compared to the magnetic attractive force between the magnet 100 and the armature 110. The control bimetal strip 38 is arranged with its high expansion side facing the wall 16 so that upon heating of the bimetal strip 38 its free end portion 60 will warp or deflect away from wall 16. The ambient temperature compensating bimetal member 40 is arranged with its low expansion side facing the bimetal strip 40 so that upon a change in ambient temperature its free end 82 tends to move in a direction opposite to the direction of movement of the free end portion 60 of the bimetal strip 38. The spring blade 42 is preferably more flexible than the compensating bimetal member 40 so that flexing of the bimetal member 40 with the ambient temperature changes tends to result in more or less flexing of the spring blade 42.

When electric power is supplied to the terminals 52 and 54, the heater 94 is energized to heat the control bimetal strip 38. The heated control bimetal strip 38 moves its free end portion 60 away from the wall 16 and tends to also move the spring blade 42 in the same direction. This movement of the bimetal strip 38 opposes the magnetic attractive force between the armature 110 and the magnet 100. The bimetal strip 38 will thus be stressed and when the force developed by the thermal energy stored therein exceeds the magnetic attractive force between the magnet 100 and the armature 110, the armature 110 is caused to snap away from the magnet 100 to remove the valve disc 74 from the valve seat 34 with a snap action. It will be apparent that if the electric energy supplied to the heater 94 is below a predetermined value required to heat the bimetal strip 38 to a temperature at which it can overcome the attractive force between the magnet 100 and the armature 110, the valve disc 74 will remain in a closed position seated on the valve seat 34. Accordingly, the gas valve 10 can be constructed to open only when the input power to the heater 94 exceeds a selected value.

Reclosing of the gas valve 10 is accomplished by deenergizing the heater 94 and thus discontinuing the heating of the bimetal strip 38. As the bimetal strip 38 cools, its free end portion 60 gradually moves toward the wall 16 and causes the armature 110 to move nearer the magnet 100. As the armature 110 approaches the magnet 100 after a sufficient cooling of the bimetal strip 38, the magnetic attractive force between the magnet 100 and the armature 110 will exceed the force due to thermal stresses exerted by the control bimetal strip 38 and the armature 110 snaps against the magnet 100. The resulting snap action motion of the spring blade 42 effects a snap action closing of the valve disc 74 on the valve seat 34. This snap action closing of the valve disc 74 is initiated before the valve disc 74 is sufficiently close to the valve seat 34 to throttle the rated gas flow through the screw 30. Accordingly, the gas valve 10 will close with a smooth, fast action.

The gas valve 10 may be used in a gas range where the ambient temperature may be considerably higher than normal room temperatures and may even approach 300° F. Under changing ambient temperature conditions, the control bimetal strip 38 and the ambient temperature compensating bimetal member 40 are at like temperatures and thus will warp or deflect in opposite directions. Upon an increase in ambient temperature, the free end portion 60 of the control bimetal strip 38 will move away from the wall 16. However, the free end 82 of the compensating bimetal member 40 concurrently deflects toward the wall 16 and acts on the spring blade 42 with a force opposed and generally equal to the force due to thermal stresses exerted by the bimetal strip 38. As the net force biasing the valve disc 74 closed against the valve seat 34 remains substantially unchanged, it will be apparent that generally the same value of electric energy must be supplied to the heater 94 to open the gas valve 10 at increased ambient temperatures as at normal room temperatures.

The operating characteristics of the gas valve 10 may be adjusted by rotating the adjustable screw 30. Such rotation varies the position of the valve seat 34 relative to the wall 16 and thereby varies the normal bias or closure force of the valve disc 74 against the valve seat 34 so that the valve disc 74 will be removed from the valve seat 34 when a desired magnitude of electrical energy has been supplied to the heater 94.

While there has been described above the principles of this invention in connection with a specific valve construction, it is to be understood that this description is made only by way of example and not as a limitation to the scope of the invention.

What is claimed is:

1. In a heat motor operated gas valve having a housing provided with a valve seat extending into said housing from a gas outlet in one wall of said housing, and further having a valve member normally biased to a closed position seated on said valve seat and operable by a control bimetal strip carrying an electric heater to remove said valve member from said valve seat when said heater is energized to heat said control bimetal strip; an improved heat motor operator comprising:

means for fixedly support said control bimetal strip by one end portion within said housing, the other end portion of said control bimetal strip being free to move in response to temperature changes;

a spring blade having opposed ends, one of said ends of said spring blade being secured to said other end portion of said control bimetal strip, said valve member being carried on the other end of said spring blade;

an ambient temperature compensating bimetal member mounted in said housing at its one end and having an outer cantilever portion offset from its fixed end in generally parallel and spaced relation to said bimetal strip, said cantilever portion being arranged to flex relative to its fixed end and having a free end acting on said spring blade adjacent said other end thereof; said ambient temperature compensating bimetal member and said control bimetal strip being arranged to deflect in opposite directions upon similar changes in the temperatures thereof; said ambient temperature compensating bimetal member having a substantially greater effective length and a correspondingly substantially lower deflection constant than said control bimetal member such that respective changes in the forces due to thermal stresses exerted upon said spring blade by said control bimetal strip and said ambient temperature compensating bimetal member upon a change in ambient temperature substantially offset each other;

magnetic means operable in conjunction with said control bimetal strip and said spring blade for effecting a snap action in movement of said valve member from and toward said valve seat, said magnetic means comprising an armature member and a permanent magnet member disposed adjacent said armature member in a position to attract said armature member, one of said magnetic means members being carried by said spring blade intermediate the ends thereof and the other of said magnetic means members being mounted in said housing in a position for urging movement of said valve member toward said valve seat;

said control bimetal member being operable upon a predetermined heating thereof by said heater to apply an operating force to said spring blade of a magnitude sufficient to overcome the magnetic attractive force between said armature member and said permanent magnet member and to thereby remove said valve member from said valve seat with a snap action; said armature member and said permanent magnet member cooperating to effect a snap action closing of said valve member on said valve seat upon return movement of said spring blade after sufficient cooling of said control bimetal strip following deenergization of said heater.

2. The heat motor operated gas valve as set forth in claim 1 wherein said valve seat is adjustably mounted in said gas outlet for adjusting the normal closure force of said valve member against said valve seat.

3. The heat motor operated gas valve as set forth in claim 1 wherein said armature member is carried by said spring blade and is biasingly mounted with spring means on said spring blade; said spring means permitting a limited movement of said spring blade relative to said armature member away from said magnet member while said armature member is magnetically attracted to said magnet member.

4. The heat motor operated gas valve as set forth in claim 3 wherein domed spacer washer means are positioned between said armature member and said spring blade to permit pivotal motion of said armature member relative to said spring blade.

5. In a heat motor operated gas valve having a housing provided with a valve seat extending into said housing from a gas outlet in one wall of said housing, and further having a valve member normally biased to a closed position seated on said valve seat and operable by a control bimetal strip carrying an electric heater to remove said valve member from said valve seat when said heater is energized to heat said control bimetal strip; an improved heat motor operator comprising:

means for fixedly supporting said control bimetal strip by one end portion within said housing, the other end portion of said control bimetal strip being free to move in response to temperature changes;

a spring blade having opposed ends, one of said ends of said spring blade being secured to said other end portion of said control bimetal strip, said valve member being carried on the other end of said spring blade;

an ambient temperature compensating bimetal member mounted in said housing at its one end and having an outer cantilever portion offset from its fixed end in generally parallel and spaced relation to said bimetal strip, said cantilever portion being arranged to flex relative to its fixed end and having a free end acting on said spring blade adjacent said other end thereof;

magnetic means operable in conjunction with said control bimetal strip and said spring blade for effecting a snap action in movement of said valve member from and toward said valve seat, said magnetic means comprising an armature member carried by said spring blade intermediate the ends thereof and a permanent magnet member mounted in said housing adjacent said armature member in a position to attract said armature member for urging movement of said valve member toward said valve seat;

mounting structure for supporting said armature member on said spring blade including spring means biasingly mounting said armature member on said spring blade and permitting a limited movement of said spring blade relative to said armature member away from said magnet member while said armature member is magnetically attracted to said magnet member; said mounting structure further including domed spacer washer means positioned between said armature member and said spring blade to permit pivotal motion of said armature member relative to said spring blade;

said control bimetal member being operable upon a predetermined heating thereof by said heater to apply an operating force to said spring blade of a magnitude sufficient to overcome the magnetic attractive force between said armature member and said permanent magnet member and to thereby remove said valve member from said valve seat with a snap action; said armature member and said permanent magnet member cooperating to effect a snap action closing of said valve member on said valve seat upon return movement of said spring blade after sufficient cooling of said control bimetal strip following deenergization of said heater.

* * * * *